July 25, 1933.    G. E. GRIFFIN    1,919,631
LIQUID FLOW CONTROLLING DEVICE
Filed Dec. 12, 1930
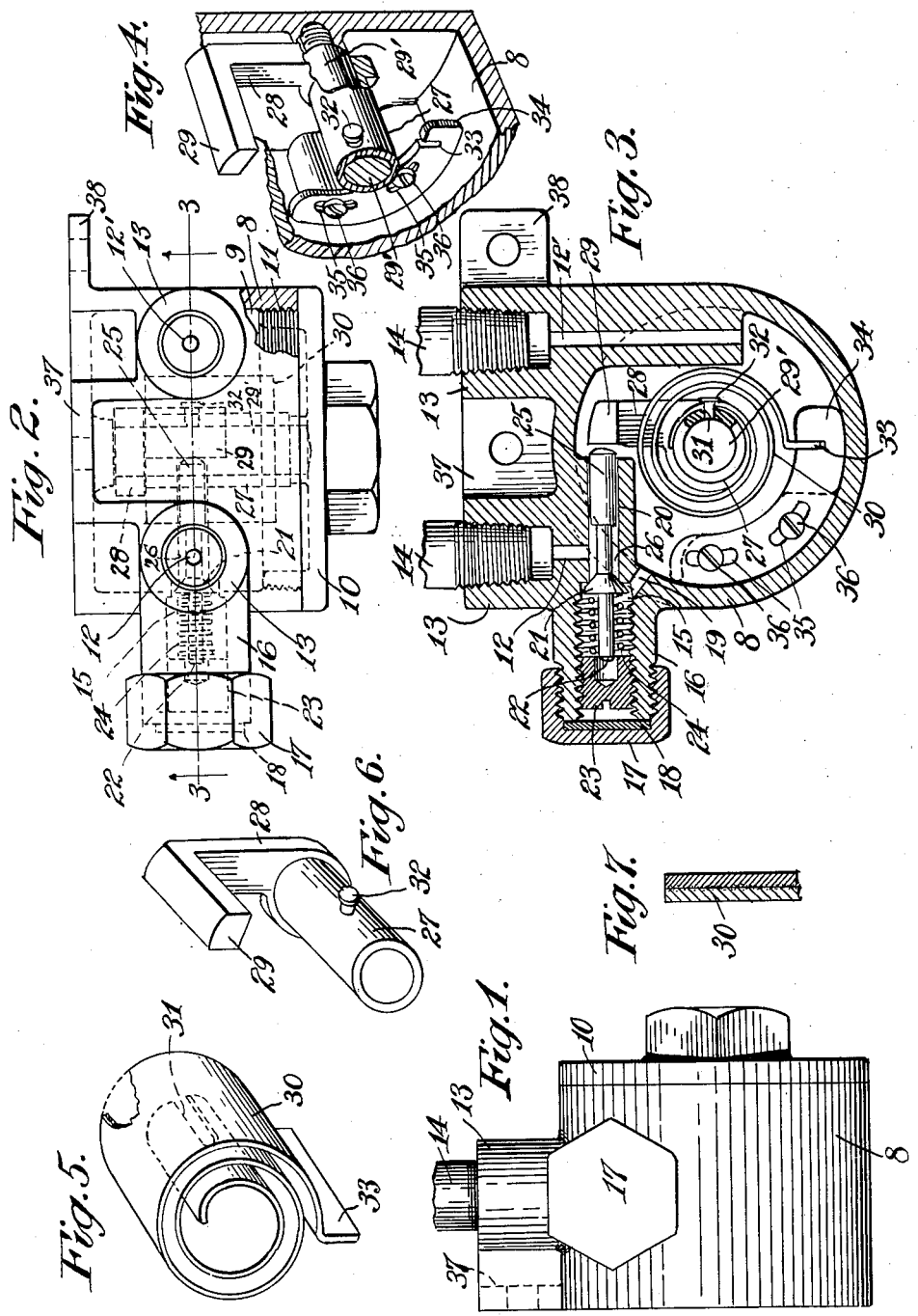
Inventor
G. E. Griffin
By John O. Seifert
Attorney Patented July 25, 1933

1,919,631

UNITED STATES PATENT OFFICE

GEORGE E. GRIFFIN, OF BROOKLYN, NEW YORK

LIQUID FLOW CONTROLLING DEVICE

Application filed December 12, 1930. Serial No. 501,787.

This invention relates to thermostatic liquid flow controlling devices for regulating a flow of liquid, and while it may be used with various apparatus it is particularly adapted for use in connection with the cooling system for refrigerating apparatus wherein the refrigerant is cooled as in a condenser of such apparatus interposed in a flow of water from a suitable source of supply, such as a city main, and the transference of the latent heat of the refrigerant to the cooling medium. In order that the refrigerant will function efficiently it is essential that it be maintained at a predetermined temperature, and to effect an efficient transference of the latent heat from and maintain the refrigerant at such predetermined temperature, the cooling medium must be maintained at a temperature below the temperature of the refrigerant.

It is the object of the invention to provide an improved constructed and arranged thermostatically controlled valve mechanism embodying a highly sensitive temperature responsive member operative through the temperature of the cooling medium to actuate the valve mechanism and regulate the supply of the cooling medium, and to provide valve mechanism of this character which is simple in construction and highly efficient in use.

In carrying out the invention there is provided a casing having a closed chamber therein having inlet and outlet ports adapted for the connection of fluid conducting conduits, one of which ports has a valve connection with the casing arranged to provide a slow flow passage of liquid through the casing operative by a member in the casing responsive to variations in the temperature of the liquid in the casing to effect expansion and contraction of said member and thereby actuation of the valve to augment the flow of liquid through the casing.

In the drawing accompanying and forming a part of this application, Figure 1 is a side elevation of my improved liquid flow controlling device.

Figure 2 is a plan view.

Figure 3 is a cross sectional view, taken on the line 3—3 of Figure 2.

Figure 4 is a fragmentary sectional view of the casing in perspective to show the manner of mounting the valve actuator in the casing.

Figure 5 is a perspective view of the temperature responsive member to control the operation of the valve actuator.

Figure 6 is a perspective view of the valve actuator; and

Figure 7 is a sectional view of a portion of the temperature responsive member.

The embodiment of the invention illustrated comprises a casing 8, preferably a casting, having a chamber 9 opening through one end thereof and closed by a cap 10 threaded into the chamber opening, as at 11, and having a flange to abut the wall at the chamber opening, which may have an interposed packing to provide a seal between the closure and casing. The casing has a pair of ports 12, 12' extended into the casing from openings enlarged relative to the ports in bosses 13 integral with and projecting from the casing and adapted for connection of fluid conducting conduits 14, preferably as by threading into the bosses as shown. One of said ports, in the arrangement shown in Figure 3 the port 12', constitutes the inlet to the casing and the other port 12 the outlet from the casing. The inlet port 12' extends substantially tangential to the inner wall of the casing chamber and opens to the casing at one side of a line extended through the axis of the casing at a right angle to the port, and the outlet port 12 is arranged to extend in a plane parallel with the inlet port and substantially tangential to the inner wall of the casing and leads from the casing chamber at the side of the axis opposite to that at which the inlet port opens to the casing chamber. By this arrangement of the ports the possibility of creating air pockets in the casing chamber is obviated.

Valve mechanism is provided to permit of a continuous slow flow passage of liquid through the casing and adapted to be operated to augment the flow of liquid to and through the casing. The valve mechanism in the present instance is associated with the outlet port 12 and comprises a chamber arranged in a recess 15 in a boss 16 extended from the exterior of the casing and closed by a cap 17 threaded thereon with packing 18 interposed between the cap and boss to provide a tight seal, the chamber so formed being in communication with the casing chamber through a passage 19. The outlet port 12 is in communication with the valve chamber 15 and the casing chamber 9 through a passageway 20 extended at a right angle to the outlet port and the port communicating with the passageway intermediate the ends thereof. The valve comprises a head 21 having a conical face to seat against the juncture of the passageway 20 with the valve chamber to control the communication of the outlet port with the casing chamber through the valve chamber. The valve head is slidably guided in the valve chamber by a stem 22 extending axially from the rear of the head into a recess in an adjustable abutment 23 threaded into the valve chamber and having a screwdriver slot to facilitate adjustment thereof. The valve is yieldingly urged to its seat by a spring 24 coiled about the valve stem 22 and confined between the valve head and abutment, and the tension of the spring being varied by screwing the abutment 23 into and out of the valve chamber. A stem 25 is extended axially from the face of the valve head through the passageway 20 with the end projected into the casing chamber, said stem having a reduced portion intermediate the valve head and end of the stem to provide a chamber 26 in the passageway with which the port 12 communicates, the enlarged outer end of the stem being of slightly less diameter than the passageway to provide a continuous slow flow connection between the port 12 and the casing chamber. The conical face of the valve head is arranged so that it will be seated intermediate the ends thereof with a portion of the face open to the valve chamber. By this arrangement the force of the pressure of the liquid in the valve chamber and casing will be distributed and equalized over the face and back of the valve head, which, with the force of the liquid in the casing on the projecting end of the valve stem 25 in the casing chamber and the liquid entering chamber 26 on the face of the valve, will counterbalance the force of such pressure on the valve and in effect provide a balanced valve.

To augment the flow of liquid to and through the casing by a rise in the temperature of the liquid in the casing thermostatically operated valve controlling means is provided, comprising a valve actuator (Figure 6) having a sleeve portion 27 with a radial extending arm 28 at one end having an end 29 offset to extend in parallel and spaced relation to the sleeve. The actuator is rotatably mounted concentrically in the casing chamber by engaging the sleeve of the actuator upon a post 29' mounted at one end upon the end wall of the casing (Figure 4), or said post may be cast integral with the casing, the actuator being retained on the post by the casing closure 10. The arm extension 29 of the actuator is arranged so that when the actuator is mounted on the post 29' said arm will extend transversely of the end of the valve stem 25 projecting into the casing.

The valve actuator is normally free of the valve and is actuated to engage the valve stem 25 and impart movement thereto to unseat the valve head by a temperature responsive member in the form of a coiled bi-metallic plate 30 (Figures 3 and 5) coiled about the sleeve portion 27 of the valve actuator on the post 29' and secured to the sleeve by a slotted portion 31 of said member engaging a headed stud 32 fixed in the sleeve intermediate the ends as the coiled member is engaged upon the sleeve, said member being fixed at the opposite end in the casing by offsetting the end outwardly and engaging the same in a slot, as at 33, in a plate 34 mounted on a boss in the casing. The member 30 is composed of two juxtaposed plates of material having two different co-efficients of expansion and united together as by fusing or otherwise, as shown in section in a diagrammatic manner in Figure 7, and said member being responsive to variations in the temperature of the liquid in the casing to effect an expansion and contraction thereof and thereby actuation of the valve 15 to open or closed positions. When the liquid in the casing is at or below a predetermined temperature the material of said member will be contracted and position the arm extension 29 of the actuator slightly out of contact with the valve stem 25. A rise in the temperature of the liquid in the casing will effect an expansion of the material of said member and a movement of the valve actuator into engagement with the valve stem and the unseating of the valve 15 opening the outlet port 12 through the chamber 26 in passageway 20 and valve chamber with the casing and an augmented flow of liquid through the casing.

To effect variations in the predetermined temperature of the liquid which it is desired to maintain in the casing the valve actuator is adjusted to variably position the same in relation to the valve stem 25 and the actuation of the valve. For this purpose the plate 34 to which the end of the temperature responsive member 30 is fixedly connected is adjustable angularly of the axis of the post 29' by arranging said plate with arcuate slots 35 for the engagement of headed securing screws 36 for the plate.

To mount the device the casing is provided with a perforated web 37 extending in the plane of the end or bottom wall of the casing interposed between and connected with the bosses 13 by angular portions and a perforated lug 38 extended laterally of and in the plane of the end or bottom wall of the casing.

While in the device as described the port 12 has been defined as the outlet port it will be obvious that the device will also function should the passage of the liquid into the casing be through said port 12.

It will be obvious that various modifications may be made in the construction and arrangement of parts without departing from the scope of the invention.

Having thus described my invention, I claim:

1. In a liquid flow controlling device, a casing having a chamber with liquid inlet and outlet ports and a valve chamber opening to the casing chamber and one of said ports, a valve having a face for seating against the juncture and controlling the connection of the valve chamber with the port to control the passage of liquid through the casing and the face and back of said valve being arranged for receiving and equalizing the force of the pressure of the liquid in the casing on the opening and closing sides thereof, a spring to urge the valve to closing position, a coiled member positioned in the casing between the inlet and outlet ports comprising juxtaposed plates of metal having different coefficients of expansion adapted to be expanded and contracted by variations of the temperature of the liquid in the casing and to effect actuation of the valve to open the one port to the casing when the temperature of the liquid rises above a predetermined degree.

2. In a liquid flow controlling device, a casing having a chamber with liquid inlet and outlet ports adapted for connection of liquid conducting conduits to connect the casing chamber in a flow of liquid, a valve having a face to seat against the juncture of one of said ports with and control the passage of liquid through the casing chamber, the face and back of the valve being arranged to receive the force of and equalize the pressure of the liquid in the casing chamber on the opening and closing sides of the valve, means to yieldingly urge the valve to closing position, and a temperature responsive member within the casing adapted to assume a contracted position when the liquid in the casing is below a predetermined temperature and to expand upon a rise of the temperature of the liquid above said predetermined temperature and actuate the valve against its yielding closing means to open said port to the casing chamber and permit of flow of liquid through the casing chamber.

3. In a liquid flow controlling device, a casing having inlet and outlet ports adapted for connection of the casing in a flow of and for the passage of liquid to and from the casing and a valve chamber having an opening to the outlet port arranged with a valve seat and a port at all times open to the casing, a valve in said chamber to control the connection of the outlet port with the valve chamber and having a stem slidably engaged in and projected into the casing through the outlet port and having a diameter to permit of a constant slow flow of liquid through the outlet port from the casing, means to yieldingly urge the valve to closing position to normally shut off the outlet port from the casing through the valve chamber, an actuator rotatably mounted in the casing to cooperate with the valve stem projected into the casing to move the valve to open position against its yielding closing means, and a coiled member within the casing comprising juxtaposed plates of metal having different coefficients of expansion and responsive to variations in the temperature of the liquid in the casing to effect expansion and contraction thereof, said member being secured at one end in the casing and the opposite end connected with the actuator and in the contracted position thereof adapted to position the actuator out of engagement with the valve stem and adapted to be expanded when the temperature rises above a predetermined temperature and effect engagement of the actuator with the valve stem and actuation of the valve to open communication with the casing through the valve chamber and augment the flow of liquid through the casing.

4. In a liquid flow controlling device, a casing having a chamber to contain liquid and a valve chamber in communication with the casing chamber and inlet and outlet ports, the inlet port opening to the casing chamber and the outlet port opening to the casing and valve chambers for the passage of liquid to and from the casing chamber, valve mechanism for controlling the connection of the outlet port with the valve chamber and arranged to provide a restricted connection between said port and the casing chamber for a continuous retarded flow of liquid through the casing chamber and the pressure of the liquid in the casing chamber to exert a counter-balancing force on the valve mechanism, and means within the casing chamber associated with the valve mechanism operative by an elevation beyond a predetermined temperature of the liquid in the casing chamber to actuate the valve mechanism to open communication between the outlet port and the valve chamber and thereby with the casing chamber to augment the flow of liquid through the casing.

5. In a liquid flow controlling device, a casing having a chamber to contain liquid arranged with a valve chamber at all times open to the casing chamber and having inlet and outlet ports, the outlet port having a right angle portion communicating with the casing and the valve chamber, a valve for controlling the connection of the outlet port with the valve chamber having a part projecting into the casing through the right angle portion of the port in communication with the casing and arranged to permit of a retarded flow of liquid through the port, means to yieldingly urge the valve to closing position to shut off communication between the outlet port and valve chamber, an actuator rotatably mounted in the casing to co-operate with the portion of the valve projecting into the casing to control the actuation of the valve and the connection of the outlet port with the casing through the valve chamber and augment the flow of liquid through the outlet port, and a bi-metallic plate coiled about the actuator within the casing fixed at the outer end of the casing and connected at the inner end with the actuator, said plate being responsive to variations in the temperature of the liquid in the casing to effect expanding and contracting movements thereof and thereby the movement of the valve actuator into and out of operative connection with the valve stem and control the actuation of the valve and flow of liquid from the casing.

6. In a liquid flow controlling device, a casing having a chamber to contain liquid having inlet and outlet ports adapted for connection of liquid conducting conduits and connection in a liquid flow, a valve to control the connection of the outlet port with the casing chamber and flow of liquid through the casing chamber and normally urged to closing position, an actuator for the valve movably supported in the casing chamber, and a coiled bi-metallic plate within the casing chamber connected at one end with the valve actuator, said plate being responsive to variations in the temperature of the liquid in the casing to effect expanding and contracting movements thereof and effect movement of the valve actuator to move the valve to open position and control the flow of liquid from the casing, and an adjustable anchor for the end of the plate to adapt the plate to effect operation of the valve actuator at different temperatures.

7. In a liquid flow controlling device, a casing having a chamber arranged with liquid inlet and outlet ports and a valve chamber opening to the casing chamber, the outlet port being in communication with the casing and valve chambers, a valve in the valve chamber having a face to be seated at the juncture of the outlet port with the valve chamber to control the connection of the outlet of the port with the valve chamber, and the face and back of the valve arranged whereby the pressure of the liquid in the casing chamber will be equalized thereon in the closing and opening positions of the valve, a spring to urge the valve to normal closing position, and thermostatically operated means controlled by variations in the temperature of the liquid in the casing chamber to actuate the valve to open position against the tension of its springs when the temperature of the liquid rises beyond a predetermined temperature to control the flow of liquid through the casing chamber.

8. In a liquid flow controlling device, a casing having a chamber and arranged with a valve chamber at all times open to the casing chamber, an inlet port through the casing wall leading into and at all times opening to the casing chamber and an outlet port communicating with a passage in the casing wall opening to the casing and valve chambers, a valve having a head to control the connection of the passage with the valve chamber, said valve having the stem slidably engaging a portion of the passage opening to the casing chamber and projecting into the casing chamber and said stem having a loose fit in the passage to provide a restricted flow communication between the casing chamber and outlet port and having a reduced portion intermediate the end and valve to provide a chamber in the passage with which said port communicates, a spring to urge the valve to normal closing position, and means within the casing to co-operate with the valve stem projecting into the casing to actuate the valve to open position and augment the flow of liquid from the casing, and means responsive to variations in the temperature of the liquid in the casing to effect an expansion and contraction thereof and by the expansion movement actuate the valve.

9. In a liquid flow controlling device, a casing having a chamber therein with inlet and outlet ports, the inlet port extending tangentially to a wall portion of the casing chamber, the inlet port opening to the casing at a point at one side of the axis of the casing and the outlet port communicating with the casing chamber at the side of the axis of the casing opposite to that at which the inlet port opens and having a normally open restricted connection with the casing chamber to provide a continuous retarded flow of liquid through the casing chamber, and a normally closed spring controlled valve connection between the outlet port and casing chamber to augment the flow of liquid through the casing chamber, an actuator to open the valve, a bi-metallic coiled member within the casing chamber composed of juxtaposed metallic plates having different co-efficients of expansion responsive to variations in the temperature of the liquid in the casing chamber to effect expansion and contraction of said member, said member by the expanding movement thereof operating the actuator to move the valve to open position and by the contracting thereof permit the valve to be closed by its spring.

10. In a liquid flow controlling device, a casing arranged with an exterior recess opening to the casing having a removable closure member to arrange the recess as a valve chamber, said casing having inlet and outlet ports arranged for the connection of fluid conducting conduits, the inlet port opening to the casing and the outlet port to a passage opening to the casing and the chamber, a valve embodying a head having a face to seat against the juncture of the passage with the valve chamber to control the connection between said chamber and passage, a stem extending axially from the rear of the head and slidably engaging in a recess in the closure, a stem extending from the face thereof and extended through the passage into the casing, said latter stem having a reduced portion intermediate the valve head and end of the stem to provide a chamber in the passage with which the outlet port communicates and the end portion of larger diameter having a loose fit in the passage to provide a continuous and restricted flow of liquid through the casing, a spring coiled about the valve stem and confined between the valve head and recessed closure to urge the valve to normal closing position, an arm rotatably mounted in the casing and extending transversely of the end of the valve stem extended into the casing, a member composed of bi-metallic juxtaposed plates having different co-efficients of expansion coiled about the support of the arm in the casing, said member having one end secured in the casing and the opposite end connected to the arm and adapted to be expanded and contracted by variations in the temperature within the casing, and said member in its contracted condition positioning the arm out of engagement with the valve stem extended into the casing and as it is expanded engaging the arm with the valve stem and unseating the valve to open the outlet port through the valve chamber with the casing and effect an augmented flow of liquid through the casing.

11. In a liquid flow controlling device, a casing having a chamber to contain liquid and inlet and outlet ports, valve mechanism for controlling the connection of the outlet port with the valve chamber and arranged to provide a restricted opening between said outlet port and the casing chamber for a continuous slow flow of liquid through the casing chamber, and a thermostat element within the casing chamber having an operative connection with the valve mechanism and operative by an elevation beyond a predetermined temperature of the liquid in the casing chamber to actuate the valve mechanism to open the outlet port to the casing chamber to augment the flow of liquid through the casing chamber.

12. In a liquid flow controlling device as claimed in claim 11, means to set the thermostat element to effect operation thereof and thereby actuation of the valve mechanism by different temperatures of the liquid in the casing.

GEORGE E. GRIFFIN.